United States Patent
Albright

[11] 3,946,775
[45] Mar. 30, 1976

[54] STUMP GRIPPER

[76] Inventor: Alva Z. Albright, 2909 Monroe Highway, Pineville, La. 71360

[22] Filed: June 5, 1974

[21] Appl. No.: 476,359

[52] U.S. Cl. .............. 144/34 A; 144/3 D; 144/34 R
[51] Int. Cl.² ................................................ A01G 23/08
[58] Field of Search ........ 144/2 Z, 3 D, 34 R, 34 A, 144/34 E, 309 AC; 63/928

[56] References Cited
UNITED STATES PATENTS

| | | | |
|---|---|---|---|
| 2,882,941 | 4/1959 | Pope | 144/34 A X |
| 3,102,562 | 9/1963 | Horncastle | 144/34 R X |
| 3,542,100 | 11/1970 | Choat | 144/34 R |
| 3,565,138 | 2/1971 | Albright | 144/34 R X |
| 3,747,651 | 7/1973 | Bangert et al. | 144/34 A |
| 3,785,415 | 1/1974 | Taponen | 144/34 R |

Primary Examiner—Donald R. Schran
Assistant Examiner—W. D. Bray
Attorney, Agent, or Firm—James B. Lake, Jr.

[57] ABSTRACT

A gripping arm for addition to tree harvesting apparatus having chain saw means, the arm being operable in opposition to a tree engaging anvil. The arm is angled and pivotally mounted on the underside of the tree engaging anvil and adapted to be hydraulically operated by its own controls simultaneously with the chain saw means. The arm swings below and parallel to the path of the chain saw means to engage and grip a tree to be harvested between itself and the tree engaging anvil as near to the ground as possible or convenient, thereby anchoring the tree harvesting apparatus to the stump part of the tree during and after its felling. The engaging edge of the arm and a lower engaging edge of opposition part of the tree engaging anvil are tapered downwardly to penetrate the stump part to firmly anchor the apparatus thereto. An upper engaging edge of the anvil is flat to non-penetrably engage the harvestable part of the tree.

1 Claim, 3 Drawing Figures

STUMP GRIPPER

CROSS REFERENCE TO RELATED APPLICATION

The invention described hereinafter will be suitable for installation on a tree harvesting apparatus as described in my U.S. Pat. No. 3,874,432, hereby incorporated by reference.

BACKGROUND OF THE INVENTION

1. Field Of The Invention

The invention relates generally to tree harvesting apparatus, and more particularly to means for establishing and maintaining said apparatus firmly anchored to the tree to be harvested and the ground in a good cutting position.

2. Description Of The Prior Art

It is old in the art to try to maintain a correct, firmly anchored cutting position by setting the brakes of power train of the apparatus, by penetrably engaging a tree both above and below the intended severance point with opposing double jaws, and by engaging a tree to be cut between a cutting chain saw and an opposing stationary anvil.

SUMMARY OF THE INVENTION

The object of the invention is to provide means for gripping the stump part of a tree to maintain the relative position of the tree harvesting apparatus in a good cutting position to the tree to be cut and the ground.

DETAILED DESCRIPTION

Figure 1:
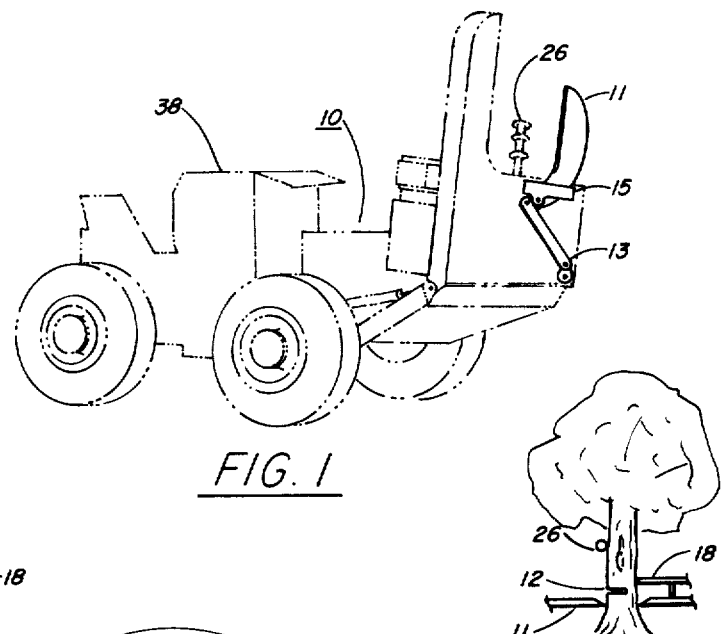
FIG. 1 is a perspective view of a tree harvesting apparatus in phantom with the invention in solid lines.
Figure 3:
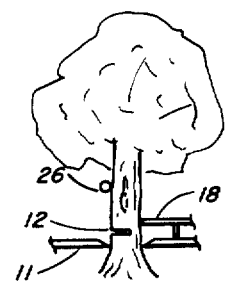
FIG. 3 is a diagrammatic end view of the gripping engagement of a tree to be harvested.
Figure 2:
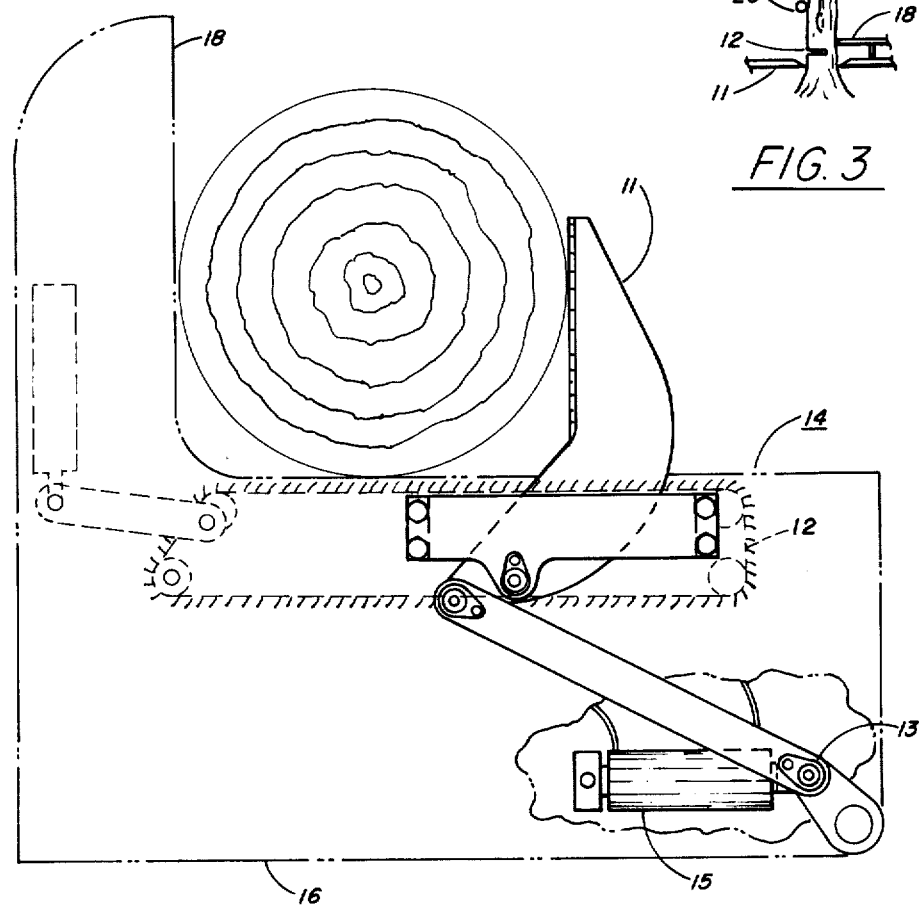
FIG. 2 is an enlarged bottom view, partially cut a way, of the invention mounted on and under the anvil of the tree harvesting apparatus.

Referring to the figures, the invention comprises an angular arm 11 connected by a linkage 13 to an hydraulic cylinder 15. The invention is fixed to a tree harvesting apparatus 10 having a chain saw 12 pivotally mounted in an anvil 14 which has a base 16 and a forward projection 18. The chain saw 12 is adapted to pivot between said base 16 and forward projection 18. The arm 11 is pivotally mounted under said base 16 to swing parallel with chain saw 12 when actuated by cylinder 15 mounted on top of base 16. The swing is in opposition to the forward projection 18 to grip a tree in the angle defined by the base 16 and projection 18. A separate control (not shown) is provided for the actuation of cylinder 15 which is operated in conjunction with hydraulic controls actuating the parallel swing of chain saw 12 to cut the tree and a pusher 26 which is provided to bias the tree as it is cut in a direction of fall.

In operation, the arm 11 is actuated to engage a tree positioned in the angle of base 16 and projection 18 of anvil 14. The gripping of the tree on three sides stabilizes apparatus 10 during the entire time of harvesting and makes the setting of brakes of a power train 38 unnecessary. The single gripping edge of arm 11 and the lower gripping edge of projection 18 are tapered sharply downward to sharp edges for penetrating and biting into the stump part of a tree. The upper gripping edge of projection 18 is flat for pressure engagement only with the harvested part of the tree. This allows the severed part of the tree to easily disengage from the upper gripping edge of projection 18 without disturbing the grip of the lower edges on the stump part and the anchoring thereby of the tree harvesting apparatus 10 to said stump part.

I claim:

1. In a tree harvesting apparatus having a pusher, a chain saw, and actuating means therefor, a stump gripper comprising:
   a. a base having forwardly directed upper and lower parallel edges, and a projection portion extending forwardly on a side of said base with upper and lower edges facing and contiguous with said base parallel edges, the upper edge of the projection portion being flat for making surface contact with a trunk portion of a tree, and said lower edge being sharpened for penetrating engagement with a stump portion of said tree, and said chain saw being adapted to swing toward said forward projection between said projection portion parallel edges and cut said tree therebetween;
   b. a stump gripping arm pivotally mounted on the bottom of said base and extending approximately parallel to said forward projection portion and adapted to swing toward it in opposition to said lower sharpened edge for engaging therebetween said tree by its stump portion below the path of said chain saw; and
   c. hydraulic cylinder means mounted on said bottom of said base and operatively linked to said stump gripping arm for the actuation thereof toward and away from said forward projection portion to respectively grip and release said stump portion of said tree positioned between said arm and said forward projection respectively before and after said tree is cut to thereby anchor said harvesting apparatus to said stump portion between opposed arm and projection during cutting and felling a tree.

* * * * *